United States Patent [19]

Murray

[11] Patent Number: 4,578,891

[45] Date of Patent: Apr. 1, 1986

[54] ROD HOLDER

[76] Inventor: Frank Murray, 1306 - 53rd St., West Palm Beach, Fla. 33407

[21] Appl. No.: 634,308

[22] Filed: Jul. 25, 1984

[51] Int. Cl.$^4$ ............................................. A01K 97/10
[52] U.S. Cl. ........................................... 43/21.2; 43/23
[58] Field of Search ....................... 43/15, 17, 21.2, 23

[56] References Cited

U.S. PATENT DOCUMENTS

| | | | |
|---|---|---|---|
| 3,159,366 | 12/1964 | Knight | 43/21.2 |
| 3,531,888 | 10/1970 | Wells et al. | 43/23 |
| 3,851,916 | 12/1974 | Quartullo | 43/21.2 X |
| 4,017,998 | 4/1977 | Dumler | 43/21.2 |
| 4,375,731 | 3/1983 | Budd | 43/21.2 |

OTHER PUBLICATIONS

Murray Brothers catalogue, pp. 3, 4, 15 and 16.

Primary Examiner—Nicholas P. Godici
Assistant Examiner—M. Jordan
Attorney, Agent, or Firm—Eugene F. Malin

[57] ABSTRACT

A fishing rod holder in the shape of a frusto-conical cylinder, having the larger frustrum open for receiving the fishing rod handle. Near the opposite frustrum from the opening is a pivotally mounted cup having a horizontally mounted pin rigidly fixed to cup. The larger frustrum and conical angle are selected to be that which is necessary to strike a fish. A fishing rod is placed in the holder, the butt end of the rod's handle resting on the pin (a slot may be placed in the rod's handle to receive the pin), and, when a fish bites, a fisherman can immediately strike the fish by pulling the rod backwards through the conical angle.

3 Claims, 4 Drawing Figures

U.S. Patent  Apr. 1, 1986  4,578,891
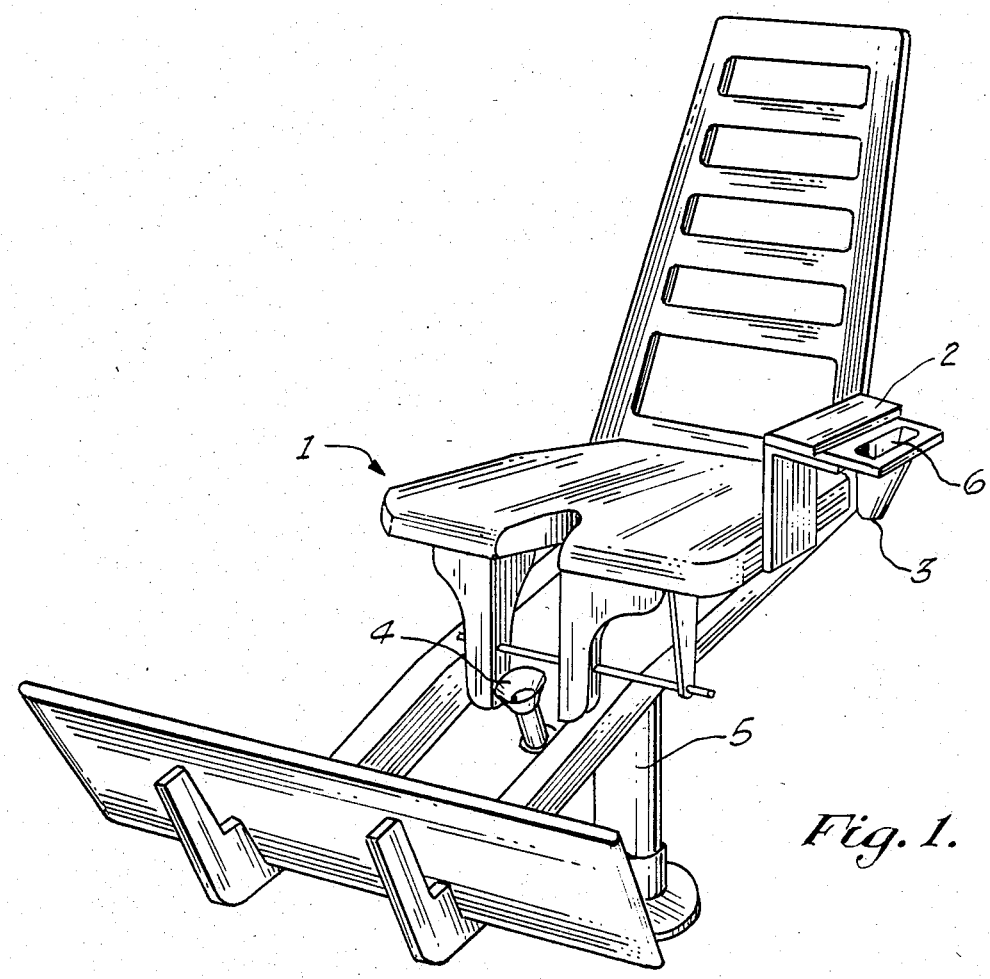
Fig.1.
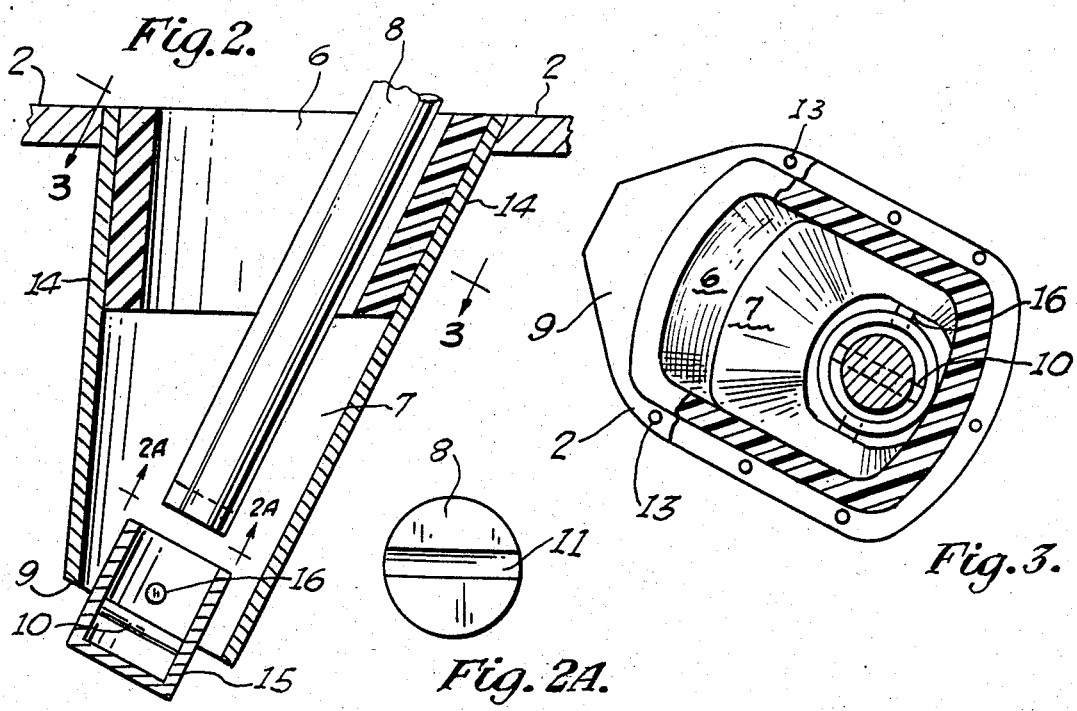
Fig.2.
Fig.2A.
Fig.3.

ROD HOLDER

BACKGROUND OF THE INVENTION

The instant invention pertains to fishing rod holders, and particularly to the kind typified by U.S. Pat. No. 4,017,998 to Dumler. The Dumler rod holder has a cylindrical receptacle 30 pivotally mounted at 36 and a C-clamp 21 whose top and bottom faces, 22 and 23, enable a fisherman to strike a biting fish by yanking rod 33 and receptacle 30 backwards about pin 36. Rod 33 is locked into cylinder 30 by camming arm 50 and cam follower 39. Although convenient, the Dumler device is complicated mechanically, having several moving parts. Thus the Dumler device is given to breakdown, and is relatively expensive to manufacture.

SUMMARY OF THE INVENTION

Accordingly, it is an object of this invention to provide an improved fishing rod holder that functions substantially identically to that of prior art holders, but without the complicated mechanical structure of such holders.

It is a further object of this invention to provide such a fishing rod holder that is less expensive to manufacture because of its simplicity, having no moving parts, and consuming less structural material to produce.

In accordance with these and other objects that shall become apparent hereinafter, there is provided a fishing rod holder having a receptacle in the shape of a frusto-conical cylinder, the larger frustrum of the cone being open to receive the handle of a fishing rod. Mounted within the receptacle is a cup mounted pivotally for rotation in a vertical plane near the opposite frustrum. The cup is adapted to supportingly receive the butt end of the fishing rod handle. The angle of the frustoconical cylinder is selected to correspond to that which a fisherman must rotate a fishing rod to hook a biting fish.

The instant invention will be more fully understood from the following detailed description, it being understood, however, that the invention is capable of extended application, and is not confined to the precise disclosure. Changes and modifications may be made that do not affect the spirit of the invention, nor exceed the scope thereof, as expressed in the appended claims. Accordingly, the instant invention will now be described with reference to the accompanying drawings.

BRIEF DESCRIPTION OF THE DRAWINGS

FIG. 1 is an elevational view of a boat's deck chair having mounted on it the fishing rod holder of the instant invention.

FIG. 2 is a sectional view along lines 2—2 of FIG. 3, showing the internal structure of the fishing rod holder of the instant invention. A fishing rod is shown being lowered into the receptacle.

FIG. 2A shows the mounting slot for attaching a fishing pole to the rod holder of the instant invention.

FIG. 3 is a top elevational view in the direction of lines 3—3 of FIG. 2.

DETAILED DESCRIPTION OF A PREFERRED EMBODIMENT

With reference to the drawing figures, and in particular FIG. 1, there is shown a boat's deck chair 1 mounted on pedestal 5 having fishing rod holders 3 and 4. Rod holder 4 is of a conventional kind, and rod holder 3 mounted on arm platform or arm rest 2 is of the kind of the instant invention.

With particular reference to FIGS. 2 and 3, the specifics of rod holder 3 are seen. Fishing rod holder 3 is attached to platform 2 (platform 2 being removed from FIG. 3 in order to show the invention more clearly) by screws 13. As is best seen from FIG. 2, fishing rod holder 3 is in the shape of a frusto-conical cylinder or similar shape having a conical angle 7. Rod holder 3 receives handle 8 of a fishing rod mounted into fishing rod holder 3 through opening 6 located at the larger frustrum of member 3. Handle 8 preferably, although not necessarily, has a slot 11 of a shape selected to mount comfortably over pin 10 rigidly mounted to horizontally opposite sides of cup 15. Cup 15 is pivotally mounted by any appropriate means (generally at 16) to the side walls 14 of hold 3 for rotation in a vertical plane coplanar with the vertical section shown in the drawing figures. Attached to side walls 14 near the vicinity of opening 6 is a plastic liner 12, which provides a non abrasive surface upon which handle 8 can rest, as well as a relatively smooth surface that provides minimum friction when a fisherman wishes to pull handle 8 out of fishing rod holder 3. Liner 12 serves to hinder handle 8 from being pulled out of holder 3 while the fishing rod is unattended. For example, if handle 8 were urged out of holder 3 responsive to a force-exerted in the vicinity of the fishing line, as handle 8 were to slide out of holder 3, handle 8 would tend to rotate (clockwise in FIG. 2) causing the end of handle 8 in the vicinity of slot 11 to strike bottom 20 of liner 12.

In use, a fisherman places handle 8 into cup 15 and onto pin 10, and waits until a fish begins nibbling at the bait on the fishing rod. The fisherman then strikes the fish by grasping handle 8 and yanking it through vertical angle 7, cup 15 rotating through angle 7 with handle 8. Angle 7 must be sufficiently large so that by rotating handle 8 through angle 7 the fishing hook will set properly. One skilled in the art, or more generally any competent fisherman, will know what this angle is.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A fishing rod holder for a fishing rod with a handle having a butt, comprising:
   a recptacle including end walls, a base and top,
   said top having an elongated central opening with a perimeter having a width greater than the width of said handle of said fishing rod, said perimeter being closed and including end portions and sides,
   said end walls constructed and arranged and having downwardly converging end walls, said downwardly converging end walls shaped and sized for abutting contact and support of a substantial portion of said handle, and
   said handle positionable in a generally vertical position into said receptacle through said central opening with said butt in contact with said base, said base positioned a substantial distance from said top,
   said ends of said perimeter of said top positioned apart a distance allowing movement free of said handle and said fishing rod from a rear position in contact with one of said end walls from generally just over vertical position to a forward position in contact with the other one of said end walls in a forward slanting position having an acute angle with a horizontal plane, said one of said end walls positioned generally upright over center on one side of the vertical positions of said fishing rod and said other one of said end walls at a substantial forward acute angle on the other side of the vertical positions of said fishing rod.

2. A fishing rod holder for a fishing rod as set forth in claim 1, wherein;

means for pivotally mounting said butt of said handle of said fishing rod within said receptacle adjacent said base for rotation of said handle with respect to said receptacle and said end walls, said rotation being in a substantially vertical plane;

said elongated opening perimeter being selected so that said fishing rod can be moved a substantial distance from said other one of said side walls to said one of said side walls to strike a fish.

3. The fishing rod holder of claim 1, wherein:

said receptacle being substantially frustoconical, said means for pivotally mounting being a cup pivotally mounted in said base within said receptacle for rotation in said vertical plane, said receptacle including generally vertical side walls and said base including an opening.

* * * * *